United States Patent Office 3,485,791
Patented Dec. 23, 1969

3,485,791
METHOD FOR COMPOUNDING RUBBER FOR INCREASING TACK
John E. Callan, Trenton, and Barry Topcik, Somerville, N.J., assignors to Columbian Carbon Company, New York, N.Y., a corporation of Delaware
No Drawing. Filed June 29, 1965, Ser. No. 468,124
Int. Cl. C08f 37/18, 45/08
U.S. Cl. 260—41.5                                          7 Claims

ABSTRACT OF THE DISCLOSURE

A method for improving the building tack of sulfur-curable ethylene-propylene terpolymer rubbers. A homogeneous mixture of an ethylene-propylene terpolymer rubber, butyl rubber, and a carbon black containing halogen on the surface is heated at about 250° F. to about 450° F. for an inversely extended period of time of from about 1 minute to about 5 hours. The heat treatment may be carried out either with or without simultaneous mastication. A preferred embodiment is to heat the mixture while simultaneously masticating by means of a Banbury mixer or a hot roll mill.

---

It is known to prepare sulfur-curable rubbery polymers by copolymerizing ethylene, propylene and a monomer containing more than one ethylenic double bond, e.g. butadiene; isoprene; cyclopentadiene; 1,4-hexadiene; dicyclopentadiene; unsaturated derivatives of bicyclo-(2,2,1)-heptane, including norbornene and bicyclopentadiene; unsaturated derivatives of bicyclo-(3,2,1)-octane; unsaturated derivatives of bicyclo-(3,3,1)-nonane; unsaturated derivatives of bicyclo-(3,2,2)-nonane; 1,5-cyclooctadiene; 1,4,9-decatriene; etc., in the presence of a coordination catalyst such as that formed by mixing a reducing compound with certain compounds of transition metals. Generally, these rubbery polymers contain about 20 to about 80 mole percent of ethylene, about 10 to about 60 mole percent of propylene and from about 0.1 to about 20 mole percent of the third monomer. Ethylene-propylene rubbers of this type are described for example in U.S. Patents 2,933,480; 3,000,866; 3,063,973; 3,093,620 and 3,093,621 and British Patent 880,904.

One of the major disadvantages of ethylene-propylene rubber is its inherent lack of building tack. Thus, when two or more layers of unvulcanized ethylene-propylene rubber are pressed together they do not adhere firmly to each other and can be readily pulled apart at the areas of contact. Lack of building tack has heretofore been a major deterrent to the wide-spread use of ethylene-propylene rubber in the manufacture of pneumatic tires, conveyor belts, and other fabricated articles wherein layers of the unvulcanized rubber must adhere firmly together during the building operation.

It has now been found that the inherently poor building tack characteristics of ethylene-propylene rubber may be greatly improved by heating it in the presence of butyl rubber and a carbon black containing halogen on its surface. Thus, sulfur vulcanizable compositions having improved building tack may be obtained in accordance with the invention by heating from about 50 to about 95 parts by weight of ethylene-propylene rubber and from about 50 to about 5 parts by weight of butyl rubber, the total amount of rubber being 100 parts by weight, with an amount of halogen-containing carbon black such that the product of the expression: (wt. percent halogen contained on black) × (percent halogen-containing carbon black by weight of butyl rubber) is at least about 120.

The term "butyl rubber" as used herein and in the appended claims is intended to designate vulcanizable rubbery copolymers of low unsaturation, such as are produced by copolymerizing a major proportion of an iso-olefin of 4 to 7 carbon atoms with a minor proportion of a multiolefin of 4 to 8 carbon atoms. The presently preferred iso-olefin for this purpose is isobutylene, although other iso-olefins such as 3-methyl-1-butene or 4-methyl-1-pentene may be employed. Multi-olefins suitable for this purpose are advantageously conjugated diolefins, for instance, isoprene, butadiene and the like.

These butyl rubber copolymers are usually prepared by copolymerizing about 0.5 to 15 weight percent of conjugated diolefin, preferably isoprene, with about 85 to 99.5 weight percent of isobutylene at a reaction temperature below about −100° F. in the presence of a Friedel-Crafts catalyst, preferably aluminum chloride, dissolved in a low-freezing non-complex forming solvent, such as methyl chloride. Copolymers produced by reacting 95 to 99.5 percent isobutylene with 0.5 to 5 percent isoprene have been found to be particularly desirable from a commercial standpoint. As is known in the art, small amounts of one or more additional hydrocarbon reactants, such as divinyl benzene or cyclopentadiene, may also be present during the polymerization reaction. Generally, the butyl rubber product has a Staudinger molecular weight of between about 20,000 and 300,000 or higher and a Wijs Iodine Number of from about 0.5 to 50. These butyl rubbers are further described in U.S. Patent 2,356,128 of Thomas et al. and in the text entitled, "Synthetic Rubber" by G. S. Whitby, 1954 Edition, published by John Wiley & Sons, Inc.

The carbon blacks used in the practice of the invention contains a halogen (i.e. fluorine, chlorine, bromine or iodine) chemically combined and/or adsorbed on the surface of the particles thereof. The bromine and chlorine-containing carbon blacks are particularly desirable.

The halogen-containing carbon blacks contemplated herein may be prepared by treating conventional carbon black, including furnace black, channel black and thermal black, with a halogenating substance in accordance with a number of suitable procedures. One suitable treatment procedure comprises intimately contacting carbon black with a gaseous halogen at a temperature of from about 0° C. to about 250° C. or more, e.g. room temperature, for 5 minutes to about 5 hours or more, e.g. 2 hours. This treatment generally results in a carbon black having a halogen content of from about 0.5 to about 7 percent by weight, at least a major portion of which is chemically combined to the surface of the black.

The choice of the carbon black to be subjected to halogen treatment is, of course, partly dependent on the intended utilization of the finished ethylene-propylene rubber composition. Thus, when it is desired that the rubber composition possess excellent stress-strain and other properties in addition to excellent building tack, it is advantageous to employ a halogen-containing carbon black derived from a furnace or channel black conventionally used for rubber reinforcement.

The heat-treatment contemplated by the invention is carried out after compounding the ethylene-propylene rubber with the halogen-containing carbon black and the butyl rubber to form a homogeneous mixture. The heat-treatment may, for example, be carried out by subjecting the mixture of ethylene-propylene rubber, butyl rubber and halogen-containing carbon black to simultaneous mastication and heating by means of a Banbury mixer or a hot roll mill. Alternatively, the composition may be exposed to heating with or without simultaneous mastication.

The temperature and time conditions at which the heat-treatment is carried out are subject to wide variation. Generally speaking, useful results are obtained by heating the composition at a temperature of from about 250° F. to about 450° F. for an inversely extended period of time of from about 1 minute to about 5 hours, although from a commercial standpoint, it is preferred to carry out the heat-treatment in a Banbury mixer at a temperature of from about 300° F. to about 400° F. for an inversely extended period of time of from about 2 minutes to about 15 minutes. In accordance with one suitable procedure the ethylene-propylene rubber, butyl rubber and halogen-containing carbon black are subjected to agitation in a Banbury to form a homogeneous composition, after which mixing is continued in the Banbury at the temperature and time conditions noted above to accomplish the heat-treatment.

Although we do not wish to be limited thereto, it is our present belief that the halogen-containing carbon black reacts chemically with the butyl rubber component of the composition, causing a substantial degree of scissioning of the polymeric chains thereof to form lower molecular weight fragments that contribute to the building tack characteristics of the entire composition. The halogen-containing carbon black is also believed to react chemically with the ethylene-propylene rubber component of the composition, but in this instance, the reaction is believed to be one of cross-linking, as opposed to chain scissioning. It is also possible that grafting of lower molecular weight butyl rubber fragments to the ethylene-propylene rubber chains takes place to some degree. This latter reaction might also be responsible, at least in part, for the outstanding building tack characteristics of the composition.

In accordance with a preferred aspect of the invention, the heat-treatment of the ethylene-propylene rubber in the presence of butyl rubber and the halogen-containing carbon black is carried out in the absence of significant quantities of metallic oxide activators, such as zinc oxide, magnesium oxide and lead oxide, and of chemical promoting agents generally used in promoting the thermal interaction of rubber and carbon black, such as para-dinitrosobenzene, para-quinone dioxime, para-nitrosophenol, N,4-dinitroso-N-methylaniline and non-curing amounts of sulfur and sulfur-containing compounds, e.g. tetramethylthiuramidisulfide. It has been found that when the heat-treatment is carried out in the presence of greater than about 3 parts of metallic oxide per 100 parts by weight of the rubber components and greater than about 0.5 parts of chemical promoting agent per 100 parts by weight of rubber, the optimum development of building tack characteristics of the ethylene-propylene rubber composition is not obtained. Apparently, the presence of significant quantities of these materials during heat-treatment, interferes with the apparent chemical reaction between the halogen-containing black and the butyl rubber component to form lower molecular weight butyl rubber fragments. The heat-treatment should, of course, also be conducted in the absence of curing amounts of sulfur and the like.

The relative amounts of ethylene-propylene rubber, butyl rubber and halogen-containing carbon black heated together in accordance with the invention are subject to wide variation. Although as previously noted, improvements in the building tack property of the ethylene-propylene rubber composition may be obtained by using an amount of halogen-containing carbon black such that the product obtained by multiplying the weight percent halogen contained on the black by the percent of halogen-containing black by weight of the butyl rubber component is at least about 120, more desirable improvements in building tack may be realized when the amount of halogen-containing black is such that said product is at least about 250.

When it is desired to provide a composition having excellent stress-strain and other properties in addition to enhanced building tack, such as is required in the manufacture of pneumatic tires, the ethylene-propylene rubber component of the composition is employed in the amount of from about 70 to about 90 parts by weight and the butyl rubber component is correspondingly employed in the amount of from about 30 to about 10 parts by weight, the amount of halogen-containing carbon black being as noted above.

Besides the amount of halogen-containing carbon black required for enhancing the tack characteristics of the composition to the desired degree, additional amounts may be employed for the purpose of reinforcing the composition. Thus, the total amount of halogen-containing carbon employed may range as high as about 250 parts per 100 parts by weight of the rubber components of the composition (i.e. ethylene-propylene rubber and butyl rubber) or higher, depending on the ultimate use of the composition. Alternatively, the composition may be reinforced by employing a conventional carbon black, such as a reinforcing furnace black, in conjunction with the halogen-containing carbon black, the total amount of carbon black ranging as high as about 250 parts per 100 parts by weight of the rubber content of the composition. When the latter procedure is followed, the conventional black may be added either during or after the heat-treatment of the composition. For most of the final applications in which the compositions provided by the invention may be used, the total amount of carbon black, including any conventional carbon black which may be used in conjunction with the halogen-containing carbon black, should desirably be within the range of from about 50 to about 150 parts per 100 parts by weight of the total rubber content of the composition.

If desired, the compositions may also be compounded with processing oils either during or after heat-treatment. However, while processing oils have not been found to seriously inhibit the development of building tack properties by interfering with the apparent thermal interaction of butyl rubber and halogen-containing carbon blacks, in some instances they might inhibit the ultimate development of good stress-strain and other properties when added to the composition during heat-treatment, and are, therefore, desirably added following heat-treatment.

Following heat-treatment, the compositions may be further compounded with antioxidants, accelerators, activators, curatives and the like according to the desires of the formulator. The resultant vulcanizable compound may then be fabricated into the desired form by the usual molding, extruding or calendering operations, and subsequently vulcanized in a conventional manner.

The excellent building tack possessed by the vulcanizable ethylene-propylene rubber compositions of the invention enables them to be used with advantage in the manufacture of pneumatic tires. For example, when used in the manufacture of a tire carcass, layers of the composition will adhere firmly together during the building operation. The compositions may also be used as tread stock and as tread cushion stock to hold the tread firmly in place on the carcass during the tire building operation. Furthermore, the compositions may be dissolved in a suitable solvent such as hexane or benzene to form a cement which may be coated on the tread stock and/or carcass to provide adhesion between the tread and the carcass during the building of the tire. The compositions also have particular applicability in the manufacture of conveyor belts and other articles wherein it is necessary to perform a laminating operation.

The invention will now be further described with reference to the following specific non-limitative examples.

EXAMPLE 1

In this illustration, a bromine-containing carbon black was prepared by intimately contacting a high abrasion furnace black (HAF) with 6% by weight of gaseous bromine at room temperature for about 2 hours in a rotating treating chamber. Following treatment, the black was heated in an oven at 350° F. for two hours to drive off excess bromine. Upon analysis by the following procedure, the black was found to contain about 3.5% by weight of bromine:

PROCEDURE FOR DETERMINING PERCENT HALOGEN (1) One gm. of the carbon (which has been vacuum dried at 100° C. for 17 hours) is weighed to the nearest 0.1 mg. into a previously weighed platinum crucible.

(2) 3.0 gms. of Eschka's Mixture are added to the crucible and intimately mixed wtih the sample. The mixture is then covered with 2.0 gms. more of Eschka's Mixture and placed in a muffle furnace at room temperature.

(3) The muffle furnace temperature is allowed to rise from room temperature to 800° C. in approximately one hour. After reaching 800° C. the muffle furnace is maintained at this temperature for an additional 1½ hours. A current of air is passed continuously through the muffle furnace during the analysis to insure complete incineration of the sample.

(4) After the incineration of the sample is complete, the contents of the crucible are quantitatively washed into a 250 ml. Pyrex beaker using boiling hot distilled water. After the transfer is complete, the walls of the beaker are washed with boiling distilled water. The total volume of distilled water for the transfer and washing should not exceed 75 ml.

(5) The beaker is covered with a watch glass and the contents of the beaker are boiled gently for ½ hour with occasional stirring to counteract the tendency of the Eschka's Mixture to clump together during boiling.

(6) After the half hour boiling the supernatant liquid in the beaker is filtered through Whatman No. 1 filter paper into a 250 ml. volumetric flask.

(7) 50 ml. more of boiling distilled water is added to the remaining solid in the beaker and the beaker is again covered with a watch glass, boiled for 20 minutes with occasional stirring and the supernatant liquid is again filtered into the 250 ml. volumetric flask containing the original filtrate.

(8) 50 ml. more of boiling distilled water is added to the remaining solids in the beaker and after a 20 minute boiling the contents of the beaker including the solids are quantitatively washed into the filter paper using boiling distilled water, and filtered into the 250 ml. volumetric flask containing the washings from the two previous extractions.

(9) After transfer, the solids in the filter paper are washed with a small portion of boiling distilled water. Care should be exercised during the final transfer and washing to see that the total volume of the filtered liquid does not exceed the 250 ml. capacity of the flask.

(10) The contents of the flask are cooled to room temperature and diluted to the 250 ml. mark with distilled water. The flask is then stoppered and well shaken to insure complete mixing of its contents.

(11) Two ml. aliquots are pipetted from the 250 ml. volumetric into 25 ml. Erlenmeyer flasks. Two drops of 1% methanolic phenolphthalein indicator are added to the flask and 1 to 2 N nitric acid is added drop by drop with swirling of the solution after each drop until the pink color disappears (usually no more than 1 or 2 drops of acid are needed).

(12) After the solution is colorless two drops of 1% potassium chromate indicator are added and the solution is titrated drop by drop with standard 0.02 N silver nitrate solution until an orange color is obtained in the solution which persists on swirling.

(13) A blank consisting of 5.0 gms. of Eschka's Mixture is run along with the sample and treated in exactly the same manner.

(14) Percent bromine is determined by the following calculations:

Bromine found (mg.)=(ml. of $AgNO_3$ for sample—ml. of $AgNO_3$ for blank)×N of $AgNO_3$×50×milliequivalent weight of bromine $$\text{Percent bromine} = \frac{\text{bromine found (mg.)}}{\text{wt. of sample (mg.)}} \times 100$$

Varying amounts of the bromine-containing carbon black and butyl rubber were simultaneously masticated and heated in a Banbury mixer with ethylene-propylene rubber. A rubber processing oil and an untreated HAF carbon black were also present during the heat-treatment.

In each case, the compositions were prepared by mixing the ethylene-propylene rubber, butyl rubber, ½ the total amount of processing oil and all of the carbon black, including the untreated HAF black in a Banbury mixer at 180° F. for three minutes. Upon mixing, the temperature of the composition increased to 350° F., at which point the second half of the processing oil was added. Mastication was continued for an additional five minutes, after which time the temperature of the composition was 300° F. and the composition was dumped from the Banbury mixer.

The compositions were then further compounded on a cold two-roll mill with stearic acid, zinc oxide, sulfur and cure accelerators. Subsequently, the mill was heated to 200° F. and milling was contained for three minutes.

For the purpose of evaluating the building tack characteristics thereof, a ⅛-inch sample of each of the vulcanizable compositions was sheeted from the mill and cut into 6-inch x 10-inch strips. The strips of each composition were pressed together by rolling with a rubber stitcher and the tack characteristics were determined immediately by attempting to pull the strips apart.

The building tack characteristics were expressed relative to a control ethylene-propylene rubber composition which was milled and compounded in the same manner as that described above, except that it did not contain butyl rubber and bromine-containing carbon black. Ratings below the value of 5 arbitrarily assigned to the control composition are indicative of the improved building tack.

Also included in this illustration for comparative purposes was an ethylene-propylene rubber composition formulated with a commercial tackifier oil.

The rubber compounding recipes, in which all amounts are in parts by weight, the building tack characteristics and the physical properties of the vulcanizates cured at 307° F. are set forth in the following table:

TABLE 1

|  | Control | A | B | C | D |
|---|---|---|---|---|---|
| Recipe: |  |  |  |  |  |
| Ethylene-propylene rubber | 100 | 85 | 75 | 65 | 100 |
| Butyl rubber |  | 15 | 25 | 35 |  |
| HAF carbon | 75 | 60 | 50 | 40 | 75 |
| Bromine-containing HAF black |  | 15 | 25 | 35 |  |
| Processing oil | 45 | 45 | 45 | 45 | 35 |
| Tackifier oil |  |  |  |  | 10 |
| Stearic acid | 1 | 1 | 1 | 1 | 1 |
| Zinc oxide | 5 | 5 | 5 | 5 | 5 |
| Mercaptobenzothiazole | 1 | 1 | 1 | 1 | 1 |
| Dipentamethylenethiuram tetrasulfide | 1.25 | 1.25 | 1.25 | 1.25 | 1.25 |
| Sulfur | 1.5 | 1.5 | 1.5 | 1.5 | 1.5 |
| (Wt. percent bromine on black)×(percent halogen-containing black by wt. of butyl rubber) |  | 350 | 350 | 350 |  |
| Rubber Properties: |  |  |  |  |  |
| 5' modulus (p.s.i.) L-300 | 150 | 200 | 220 | 200 | 130 |
| 5' tensile strength (p.s.i.) | 1,420 | 1,500 | 1,500 | 1,170 | 855 |
| 45' L-300 | 1,230 | 1,100 | 1,050 | 1,110 | 720 |
| 45" Tensile | 3,000 | 2,550 | 2,360 | 2,280 | 2,580 |
| 45" elongation, percent | 560 | 565 | 565 | 550 | 685 |
| 45" Shore hardness | 59 | 55 | 57 | 59 | 58 |
| Maximum tensile | 3,050 | 2,560 | 2,400 | 2,280 | 2,580 |
| Mooney viscosity (ML-4 at 212° F.) | 64.5 | 67 | 71.5 | 73.5 | 63 |
| Tack rating | 5 | 3.5 | 2 | Rupt. | 5 |

As will be noted from the above data, the compositions prepared in accordance with the invention were characterized by decidedly improved building tack compared to the control and the composition formulated with a commercial tackifier, composition D, and furthermore possessed desirable physical properties when cured. It will also be noted that the building tack of composition C was exceptionally outstanding. Indeed, the adhesion between the vulcanizable strips of composition C was so great, that the continued application of a pulling force caused the stripes to elongate and rupture.

EXAMPLE 2

In this illustration, a carbon black containing 3% by weight chlorine was prepared by treating a high abrasion furnace black with chlorine in a rotating treating chamber at room temperature for 2½ hours. Following heating at 350° F. in an oven to drive off excess chlorine, 75 parts by weight of the chlorine containing black was mixed with 80 parts by weight of ethylene-propylene rubber and 20 parts by weight of butyl rubber in a Banbury mixer for two minutes in order to obtain a homogenous mixture. At this point, the temperature of the composition was measured to be about 300° F. The composition was then subjected to further mastication in the Banbury for four additional minutes. Upon dumping, the temperature of the composition was determined to be about 375° F.

The composition was then further compounded with processing oil, zinc oxide, stearic acid, sulfur and cure accelerators on a cold rubber mill. When incorporation of these ingredients was complete, the temperature of the mill was increased to 200° F. and the composition was further milled for three minutes.

The compounding recipe, in which all amounts are in parts by weight, as well as the tack properties of the vulcanizable composition, expressed relative to the control composition of Example 1, and the physical properties of the vulcanizate cured at 307° F. were as follows:

TABLE 2

Recipe:
| Ethylene-propylene rubber | 80 |
|---|---|
| Butyl rubber | 20 |
| Chlorine-containing carbon black | 75 |
| Processing oil | 45 |
| Stearic acid | 1 |
| Zinc oxide | 5 |
| Mercaptobenzothiazole | 1 |
| Dipentamethylenethiuramtetrasulfide | 1.25 |
| Sulfur | 1.5 |
| (Weight percent halogen on black)×(percent chlorine-containing black by weight of butyl rubber) | 1125 |

Rubber properties:
| 5' Moduls (p.s.i.) L-300 | 200 |
|---|---|
| 5' tensile strength (p.s.i.) | 1500 |
| 45' L-300 | 1200 |
| 45" tensile | 2760 |
| 45" elongation (percent) | 560 |
| 45' Shore hardness | 55 |
| Maximum tensile | 2880 |
| Mooney viscosity (ML-4 @ 212° F.) | 72 |
| Tack rating | 2 |

It will be noted from the above data that the composition prepared in accordance with the invention had excellent building tack characteristics and furthermore possessed physical properties substantially equivalent to the ethylene-propylene rubber control composition included in Example 1, above.

EXAMPLE 3

The compounding recipe and procedure set forth in Example 2 were repeated except that 15 parts by weight of the chlorine-containing carbon black and 60 parts by weight of untreated HAF black when employed in place of 75 parts by weight of the chlorine-containing black. Thus, the product obtained by multiplying the weight percent of chlorine contained on the carbon black by the percent of chlorine-containing black by weight of butyl rubber was 225.

The resultant composition had a tack rating of 3.5, and had vulcanized properties substantially equivalent to the composition of Example 2.

While the invention has been described above with respect to certain preferred embodiments thereof, it will be understood by those skilled in the art that various changes and modifications may be made without departing from the spirit and scope of the invention as expressed in the appended claims.

Therefore, we claim:

1. A method for compounding sulfur-curable ethylene-propylene rubber which compirses the steps of:
   (a) homogeneously mixing ethylene-propylene rubber, butyl rubber, and a carbon black containing about 0.5 to about 7 weight percent of halogen on the surface thereof, said ethylene-propylene rubber being a copolymerization product of ethylene, propylene and a third monomer containing more than one ethylenic double bond, the amount of said ethylene-propylene rubber being from about 50 to about 95 parts by weight and the amount of butyl rubber being from about 50 to about 5 parts by weight, the total amount of rubber being 100 parts by weight, said carbon black being in an amount such that the product obtained by multiplying the weight percent halogen contained on the black by the percent of halogen-containing black with respect to the weight of the butyl rubber component is at least about 120; and (b) producing a vulcanizable compound characterized by significantly improved building tack of said ethylene-propylene rubber by heating the mixture formed in step (a) in the absence of significant amounts of curatives, metal oxide activators, and chemical promoters at a temperature of about 250° F. to about 450° F. for an inversely extended period of time of from about one minute to about five hours.

2. Method as in claim 1 wherein said mixture is simultaneously masticated and heated.

3. Method as in claim 1 wherein said halogen-containing carbon black is derived from a furnace black.

4. Method as in claim 1 wherein said halogen-containing black is selected from the group consisting of chlorine-containing carbon blacks and bromine-containing carbon blacks.

5. Method as in claim 1 wherein the amount of said halogen-containing carbon black is such that the product obtained by multiplying the weight percent of halogen contained on said carbon black by the percent of the halogen-containing carbon black by weight of said butyl rubber is at least 250.

6. Method as in claim 1 wherein the amount of said halogen-containing carbon black does not exceed about 250 parts per 100 parts by weight of the combined weight of said ethylene-propylene rubber and said butyl rubber.

7. The method of claim 1 wherein from about 70 to about 90 parts by weight of ethylene-propylene rubber are mixed with from about 30 to about 10 parts by weight of butyl rubber, the total weight of rubber being 100 parts.

References Cited

UNITED STATES PATENTS

| | | | |
|---|---|---|---|
| 2,118,601 | 5/1938 | Gerke et al. | 260—763 |
| 2,408,696 | 10/1946 | Smallwood | 106—307 |
| 3,140,192 | 7/1964 | Jordan et al. | 106—307 |
| 3,200,174 | 8/1965 | Adamek et al. | 260—889 |
| 3,311,151 | 3/1967 | Willis et al. | 260—889 |

OTHER REFERENCES

Waddell et al., "Properties of a New Unsaturated Ethylene-Propylene Elastomer," Rubber Age, Vol. 94, No. 3, December 1963, pages 427–433 and 435–437 (pages 435 and 436 relied on).

MORRIS LIEBMAN, Primary Examiner

H. H. FLETCHER, Assistant Examiner

U.S. Cl. X.R.

106—307; 260—889